(12) United States Patent
Bacher et al.

(10) Patent No.: US 7,404,665 B2
(45) Date of Patent: Jul. 29, 2008

(54) DEVICE FOR CHARGING A SCREW LODGED IN A HOUSING AND METHOD FOR OPERATING A DEVICE OF THIS TYPE

(76) Inventors: Helmut Bacher, Schmidbergerweg 5, St. Florian (AT) A-4490; Helmuth Schulz, Hirschgasse 16/12, Linz (AT) A-4020; Georg Wendelin, Waldbothenweg 84, Linz (AT) A-4033

( * ) Notice: Subject to any disclaimer, the term of this patent is extended or adjusted under 35 U.S.C. 154(b) by 399 days.

(21) Appl. No.: 10/480,132

(22) PCT Filed: Jun. 6, 2002

(86) PCT No.: PCT/AT02/00171

§ 371 (c)(1),
(2), (4) Date: May 26, 2004

(87) PCT Pub. No.: WO02/100624

PCT Pub. Date: Dec. 19, 2002

(65) Prior Publication Data

US 2004/0202744 A1    Oct. 14, 2004

(30) Foreign Application Priority Data

Jun. 11, 2001    (AT) .............................. A 902/2001

(51) Int. Cl.
*B29C 47/92*    (2006.01)
(52) U.S. Cl. ................ 366/76.9; 366/154.1; 366/155.2; 366/157.1; 366/294; 366/295
(58) Field of Classification Search .............. 366/154.1, 366/155.2, 157.1, 158.1, 149, 147, 298, 294, 366/76.9
See application file for complete search history.

(56) References Cited

U.S. PATENT DOCUMENTS 3,602,394 A * 8/1971 McCune ...................... 222/43

(Continued)

FOREIGN PATENT DOCUMENTS

| EP | 0749818 A2 | 12/1996 |
| JP | 03260187 | 11/1991 |
| WO | WO 00/64654 A1 | 11/2000 |
| WO | WO 01/39948 A1 | 6/2001 |

*Primary Examiner*—Tony G Soohoo
(74) *Attorney, Agent, or Firm*—Townsend and Townsend and Crew, LLP

(57) ABSTRACT

An apparatus for filling a screw (7) bearingly supported within a housing (6), in particular of an extruder, for processing of pre-comminuted synthetic plastics material, in particular PET, has a filling opening (5) for the screw housing (6). This filling opening (5) is in flow connection with the lower outflow opening (4) of an upright receptacle 81) for the material to be processed. Within the receptacle (1), tools (30, 31) circulate around a preferably vertical axis, and they act on the material positioned within the receptacle (1). This material is introduced into the evacuable receptacle (1) through a sluice (60). A quickly circulating tool (30) for creating a mixing cone (71) is disposed between an upper interior portion (68) and a lower interior portion (69) of the receptacle (1). Within the lower interior portion (69) that constitutes a dwell space for the heated plastics material that has reached it for thermal homogenization thereof, also circulating tools (31) are disposed, which, however, are mere mixing tools without substantial introduction of power, so that within this dwell space an agglomeration of the plastics material is avoided.

26 Claims, 5 Drawing Sheets

U.S. PATENT DOCUMENTS

| | | | | |
|---|---|---|---|---|
| 3,669,416 A | * | 6/1972 | Sutter et al. | 366/145 |
| 4,390,285 A | * | 6/1983 | Durr et al. | 366/170.3 |
| 4,403,868 A | * | 9/1983 | Kupka | 366/295 |
| 4,610,124 A | * | 9/1986 | Watanabe et al. | 53/399 |
| 5,217,800 A | | 6/1993 | Pentecost | |
| 5,609,831 A | * | 3/1997 | Kempter | 422/135 |
| 6,357,905 B1 | * | 3/2002 | Birchard | 366/65 |

* cited by examiner

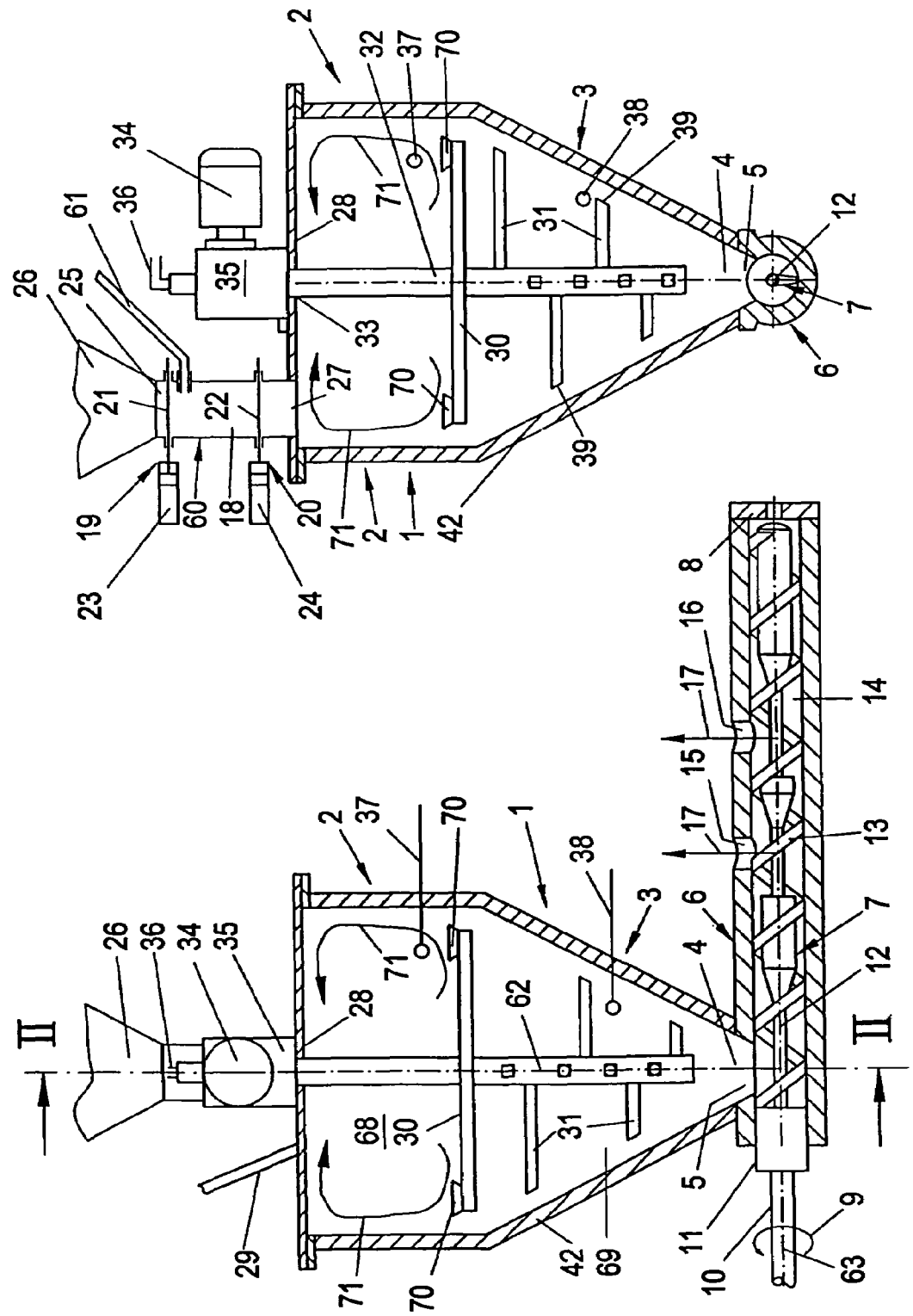

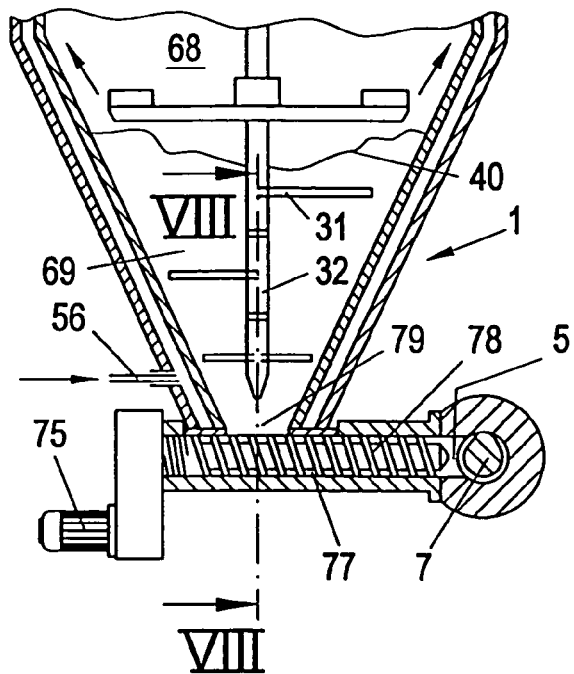
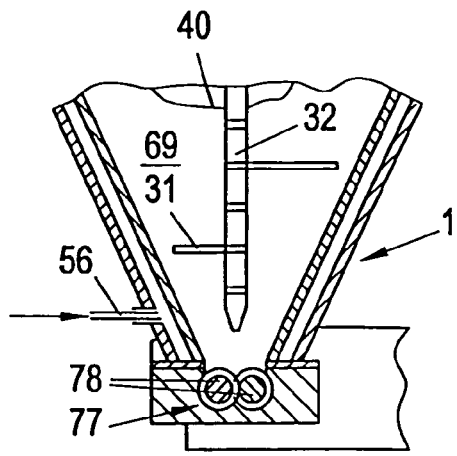
FIG. 7     FIG. 8
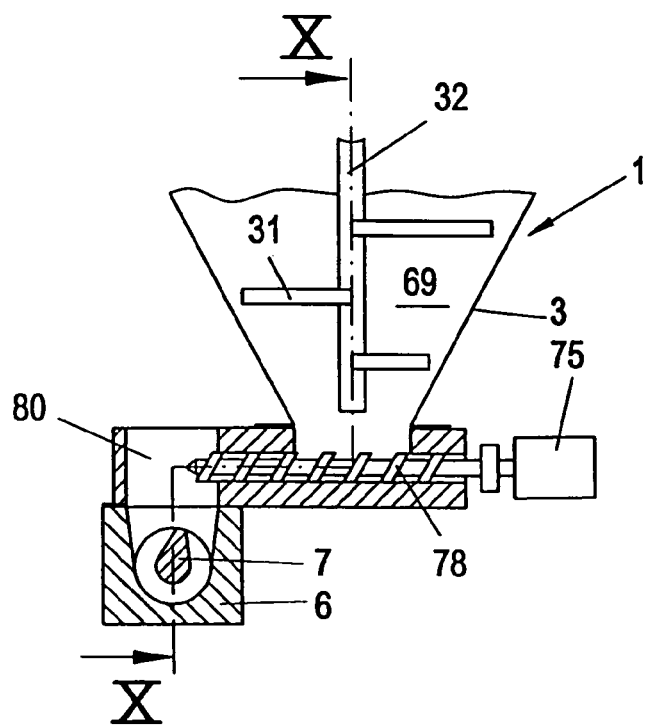
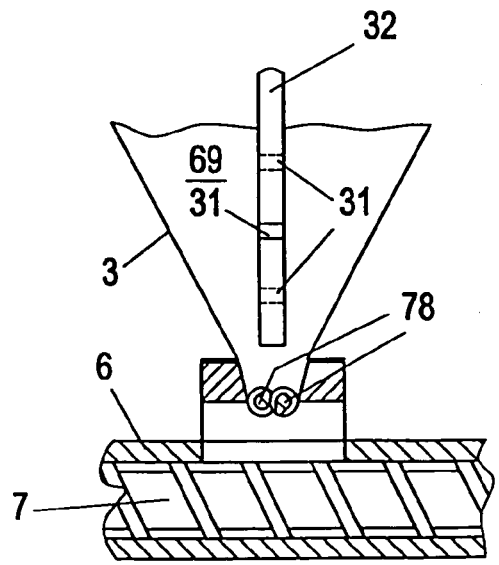
FIG. 9     FIG. 10

DEVICE FOR CHARGING A SCREW LODGED IN A HOUSING AND METHOD FOR OPERATING A DEVICE OF THIS TYPE

BACKGROUND OF THE INVENTION

The invention relates to an apparatus for filling a screw bearingly supported within a housing, in particular of an extruder, for processing of pre-comminuted synthetic plastic material, wherein the filling opening of a screw housing is in flow connection with the lower outflow opening of an upright vacuum-tight receptacle for material to be processed, and wherein, within the receptacle, tools are provided which are driven by a drive means for rotation around an, in particular vertical, axis, which tools act onto the material that is introduced into the receptacle from above through a sluice. Further, the invention relates to a process for operation of such an apparatus.

An apparatus of the initially described kind is known to the applicants from practice as a vacuum hopper for injection molding or extrusion machines. Such a construction, however, cannot suitably be used for all kinds of synthetic plastic material, in particular not for such kinds of plastics which require a longer dwell time within the receptacle, for example PET (polyethylene terephthalate), for example comminuted material deriving from bottles, bottle pre-forms, foils or plates. This material, as a rule, is not pre-crystallized and requires a certain temperature and homogenous distribution before it is introduced into the screw housing for plastification.

SUMMARY OF THE INVENTION

The invention has as an object to improve an apparatus of the initially described kind so that the requirements mentioned above are met, which means that such special kinds of plastics, in particular milled PET-material, are so processed within the receptacle that the material is fed with the desired homogenous condition into the filling opening of the screw housing. The invention solves this task by the features that within the receptacle, in the middle region of the height thereof, at least one tool that quickly rotates for creating a mixing cone is disposed between an upper interior portion and a lower interior portion of the receptacle, wherein within the upper interior portion the processed plastic material, in particular PET, circulates in the form of a mixing cone with introduction of power, whereas the lower interior portion constitutes a dwell space for the heated plastic material that has reached it, for thermal homogenization of the material, and wherein tools circulating within this dwell space are formed as mere mixing tools without substantial power introduction in order to avoid agglomeration of the plastic material. Within this, the invention starts from the finding that it is difficult to feed the screw with material processed within the receptacle and having a uniform dwell time through the lower outflow opening of the receptacle. Tests have shown that this difficulty can be overcome by the fact that within the upper region of the receptacle the power necessary for obtaining the desired temperature range of the material can be relatively quickly obtained by the tool circulating within this region. The power that can be introduced by the circulating tools is smaller in the lower region of the receptacle, because there processing is less intensive, which contributes to avoiding overheating of the material, although the processed material remains within the lower inner part of the receptacle mostly for a considerable dwell time. This dwell time ensures a good thermal homogeneity of the material entering the screw housing and, therefore, a good quality of the material that is conveyed by the screw to a further processing, for example an extruder. The longer the average dwell time of the material within the receptacle is, the less is the likelihood that a plastic particle that is not sufficiently pre-heated or, respectively, dried or, respectively, pre-crystallized, enters the screw housing, which is not desired. The minor action of the tools disposed within the lower receptacle section contributes also to supply the stirred material without any difficulty, in particular without clustering by agglomeration, to the filling opening of the screw housing which suitably is immediately connected to the outflow end of the receptacle, but which in special cases, however, can also be connected therewith via a connecting tube. The evacuability of the receptacle ensures a better drying of an eventual wet material and shields the pre-heated material, in particular PET, against the air oxygen, so that this material can be pre-crystallized in the desired manner and a high pre-crystallization value can be obtained. In the described manner, also wet plastic material (humidity up to about 5%) can be processed, because within the upper inner space portion of the receptacle the higher additional power required for drying can be introduced without any problem, without which there is the danger of a non-homogenous treatment of the synthetic plastic material.

According to a further embodiment of the invention, the tool circulating within the central region of the receptacle is positioned on the upper side of a disc, the edge thereof being spaced a small distance from the inner wall of the receptacle. Within the spirit of the invention, this distance amounts to at least 20 mm. By this distance, an annular-shaped penetration opening around the edge of the disc is provided for the plastic material processed within the upper inner space portion of the receptacle, through which this material gradually reaches the lower inner space portion of the receptacle from the upper inner space portion. The most favorable distance for forming this annular gap depends on the type of processed plastics material and upon the degree of comminuting it. The greater the density of the processed material, the smaller can be the size of the annular gap. In order to enable an adaptation to different conditions, it is suitable within the spirit of the invention if the size of the distance can be adjusted, and this can be designed by a suitable adjustment of marginal sections of the disc without any problem.

The introduction of the processed material disposed within the receptacle into the intake opening of the screw housing is facilitated if the receptacle has an upper cylindrical section and a lower conical section which tapers towards the filling opening of the screw housing. Such a construction has also the advantage that the tools disposed within the conical section of the receptacle get shorter and shorter from above to below, so that, when a sufficient stirring action is maintained, the power introduction into the treated material becomes negligibly small. Within that, it is of advantage when within the spirit of the invention the tool creating the mixing cone is disposed in the region of the upper end of the conical section, because this favors forming the mixing cone by the inclined wall sections.

It has been shown that favorable relations between the height of the cylindrical section and the height of the conical section are in the range of between 3:1 and 1:3.

As already mentioned, the tools disposed within the lower inner space section of the receptacle are mere mixing tools. This may hold also for the tools creating the mixing cone in the upper inner space portion of the receptacle, because comminuting of the plastic material that is mostly introduced in a pre-comminuted condition into the receptacle is, as a rule, not necessary. If desired, however, a tool disposed in the upper section of the receptacle can be formed as a comminuting tool, preferably it can be provided with cutting edges, in particular if such comminuting tools are carried by the disc separating the two inner space sections of the receptacle.

For construction reasons, it is favorable to close the vacuum-tight receptacle by a cover which has an opening for introduction of the material, to which a chamber is connected that can be closed above and below by vacuum-tight closeable valves, in particular gates, and to which an evacuating line is connected, wherein an additional evacuating line is connected to the receptacle. This chamber acts as an evacuable sluice for the material to be introduced into the receptacle, so that no air oxygen reaches the receptacle when filling it. The cover can be used for carrying the drive means, in particular a controllable drive means, and, if desired, also a gear means, for the tools. Such a drive means enables one to change the speed of rotation of the tools and to adapt thereby to the respective present circumstances. A finer adjustment of desired operation conditions within the receptacle is obtained according to a further embodiment of the invention by the features that the tools positioned within the lower section of the receptacle and the tools positioned within the upper section of the receptacle are driven via coaxial shafts independently from each other. Thereby, the object aimed at can be met in a particular favorable manner, namely by introducing the power in the upper section of the receptacle as quickly as possible into the material positioned there, for example by tools quickly rotating there. However, in the lower receptacle section it is intended to thermally homogenize the material, in order to keep the desired exit temperature at the outflow opening of the funnel, and for this a comparatively lower circulation of the tools may be sufficient.

It is suitable for obtaining the desired effect to provide according to the invention in the upper and in the lower sections of the receptacle at least one temperature sensor each and to control the operation process in dependence from the temperature conditions detected by these temperature sensors. In order to avoid heat losses to the outside, the receptacle has heat-insulating walls. A further possibility to influence the temperature conditions within the receptacle consists in that the receptacle has at least one double-walled casing section, the hollow space of which is connected to a line for a temperature control medium which can be a liquid or a gas. Thereby, for example, heating of the material positioned within the upper receptacle section can be accelerated by applying additional heat power via the temperature control medium, and/or a cooling of the material positioned within the lower receptacle section can be obtained via the temperature control medium.

It has been shown that particular favorable operating conditions can be obtained if the effective volume of the receptacle corresponds at least to the half throughput per hour of the screw, preferably to the single to triple throughput. For this, it is suitable if the entire tools introduce into the processed plastics material a mixing energy of 3 to 12 kWh per 100 kg throughput of the extruder screw. This is sufficient also for processing wet synthetic plastic material. The by far predominant portion of this mixing energy is introduced by the tools relating to the upper interior portion of the receptacle.

The inventive process for operating an inventive apparatus is characterized in that the energy introduced into the material contained within the receptacle is controlled by controlling the rotational speed of at least one shaft carrying the tools. Thereby optimal results can be obtained. This control of the rotational speed of the tools is suitably made independent from the temperatures of the processed material measured in the lower and upper sections of the receptacle. If desired, an additional tempering of the processed plastic material can be obtained by introduction of a tempering medium into at least one of the tools. Alternatively, or in addition thereto, tempering of the material contained within the receptacle can be performed by supplying a tempering medium into the hollow space of at least one double-walled section of the casing of the receptacle.

BRIEF DESCRIPTION OF THE DRAWINGS

In the drawings, exemplary embodiments of the subject matter of the invention are schematically shown.

FIG. 1 shows a first embodiment in a vertical section;

FIG. 2 is a section taken along the line II-II of FIG. 1;

FIG. 7 is a vertical section through a detail of a constructional variant to FIG. 6;

FIG. 8 is a section taken along the line VIII-VIII of FIG. 7;

FIG. 9 shows in a section similar to FIGS. 6 and 7 a further variant; and FIG. 10 is a section taken along the line X-X of FIG. 9.

DESCRIPTION OF THE PREFERRED EMBODIMENTS

Figure 3:
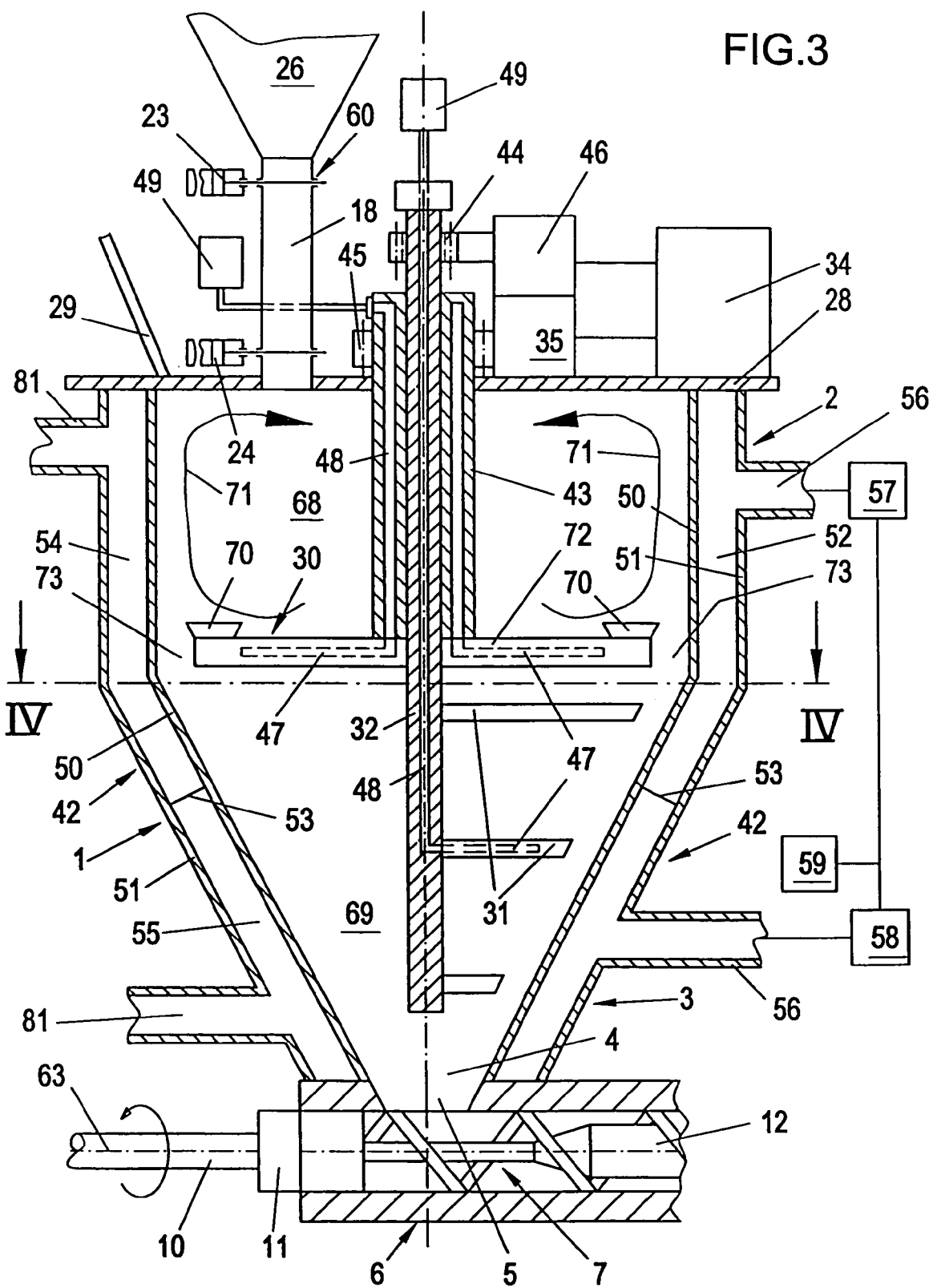
FIG. 3 shows a second embodiment in a section similar to FIG. 1.

In the embodiment according to FIGS. 1 and 2, the apparatus comprises a stationary receptacle 1 for the synthetic plastic material to be processed which, in particular, is pre-comminuted PET-material that is therefore in a pourable condition. As a rule, this material derives from comminuted, in particular milled, bottles, bottle pre-forms, foils or plates of PET. The upright receptacle 1 has a vertical axis 62 and a substantially cylindrical upper section 2 to which a frusto-conical lower section 3 is connected. The two sections 2, 3 confine an upper interior portion 68 and a lower interior portion 69 of the receptacle 1. The entire receptacle 1 has a large volume for processing large volumes of material in order that all material portions of the material to be processed remain within the receptacle 1 for a certain, sufficiently long dwell time to be sufficiently pre-conditioned before the respective material enters from the lower outflow opening 4 of the receptacle 1 into a vacuum-tight filling opening 5 of the housing 6 of a screw conveyor/extruder 7. For example, the volume of the receptacle 1 is such that the material contained therein reaches an average processing time in the container 1 of about one hour. The housing 6 together with the screw 7 forms mostly an extruder; it can be a single screw extruder or a multiple screw extruder. Within the housing 6, the material supplied through the filling opening 5 to the screw 7 is plasticized by the screw and is extruded in a known manner through an extruder head 8 in the form of ropes. A granulating apparatus (not shown) or another shape-producing tool can be connected to the extruder head 8. However, the screw 7 can also be a mere conveying screw or, respectively, a dosing screw which feeds the material conveyed by it to any desired processing apparatus, for example to an extruder. The filling opening 5 is suitably vacuum-tightly connected directly to the discharge opening 4; only in special cases an indirect connection can be made, for example by means of a vacuum-tight tube.

The screw 7 is driven in the direction of the arrow 9 by a drive means (not shown) via a shaft 10 which intersects a vacuum-tight front-side closure 11 of the housing 6 and is connected for common rotation to the core 12 of the screw 7.

As it is shown, this core 12 can have different diameters over the axial length of the screw 7. In the embodiment shown, the core diameter increases towards two relief zones 13, 14 each, in front of which the conveyed material is in each case compressed and plasticized and is then subjected to pressure decrease in the relief zones 13 or 14, respectively. By this pressure decrease, the gas bubbles contained within the material conveyed by the screw 7 can release and can escape through de-gassing openings 15 or 16, respectively, from the housing 6 in the direction of the arrows 17. Suitably, these gases are collected and, if desired, utilized. Adjacent the second relief zone 14 the diameter of the screw core 12 increases again, so that the material conveyed by the screw 7 reaches the extruder head 8 or, respectively, the exit nozzles disposed therein in a sufficiently plasticized condition.

The material to be processed is supplied to the receptacle 1 through a chamber 18 (FIG. 2) of an evacuable sluice 60 which is vacuum-tightly constructed and, for this, is provided above and below with valves 19 or 20, respectively. Suitably, these valves 19, 20 are constructed as gate valves, the gate plates 21 or 22 of which intersect vacuum-tightly the walls of the chamber 18 and can be moved reciprocably by means of hydraulically or pneumatically actuated cylinders 23, 24. To the upper filling opening 25 of the chamber 18 there is connected the outflow end of a hopper 26 via which the material to be processed is introduced into the apparatus. The lower outflow end of the chamber 18 is vacuum-tightly connected to an opening 27 of a cover 28 by which the receptacle 1 is vacuum-tightly closed in the upward direction. To this cover 28 an evacuating line 29 is connected, by which the interior of the receptacle 1 can be evacuated. By means of a further evacuating line 61 the sluice 60 is evacuable.

Within the receptacle 1, tools 30, 31 constituted by radial wings revolve around the vertical container axis 62. These tools 30, 31 are fixed to a vertical shaft 32 that is coaxial to the container axis 62 and may extend outwardly from this shaft in a substantially horizontal direction. The shaft 32 is vacuum-tightly bearingly supported for rotation in the cover 28 at location 33 and is driven for rotation by a controllable motor 34, if desired via a gear train 35. The control lines therefor are marked with 36. The tools 30 are disposed in the region of that level of the receptacle 1 in which the funnel-shaped lower section 3 merges into the cylindrical upper section 2. These tools 30 extend close to the wall of the section 2 of the receptacle 1 and, therefore, cause by their high peripheral velocity an intensive stirring of the material introduced into the receptacle 1. If necessary, these tools 30 may be provided with cutting edges 70 so that the processed material is also comminuted. At this processing, the material contained within the upper interior portion 68 of the receptacle 1 is circulated in the form of a mixing cone 71. The power required for this passes for its major part as heat energy into the so treated material and heats it thereby. As can be seen, the tools 31 disposed within the lower interior portion 69 of the receptacle 1 are shorter than the tools 30 disposed within the cylindrical upper section 2 of the receptacle 1. The lower tools 31, therefore, introduce due to their lower peripheral velocity less energy into the processed plastic material than the upper tools 30. Therefore, within the upper section 2 of the receptacle 1, a quick energy introduction for heating the plastic material supplied cold from above takes place, which material gradually descends to below and reaches the region of the shorter tools 31, caused by the material discharge through the outflow opening 4 performed by the screw 7. The shorter tools 31 only stir the plastic material disposed in the lower interior portion 69 of the receptacle 1, which constitutes a dwell space for the processed heated material where thermal inhomogeneities are equalized. At the same time, an agglomeration of the heated plastic material is avoided. Particularly when the lower interior portion 69 of the receptacle 1 is taller than the upper interior portion 68, there results the intended considerable dwell time of the processed and stirred plastic material within the interior portion 69. Suitably, the conditions are so chosen that the entire effective volume of the receptacle 1 corresponds at least to the throughput of the screw 7 for half an hour. The temperatures occurring within the processed plastic material in the sections 2 and 3 of the receptacle 1 are suitably monitored by temperature sensors 37 or 38, respectively, to which lines are connected leading to a control device (not shown) which sends suitable control signals via control lines 36 of motor 34. The ends 39 of the tools 31, which become shorter in the downward direction, may be chamfered, as shown in FIG. 2, in order to adapt them to the funnel shape of the container section 3. Suitably, the tools 31 are very thin, so that they introduce as little energy as possible into the material.

If desired, the rods of the upper tools 30 extending outwardly from the shaft 32 can also be provided with mixing wings in order to increase the friction action onto the material contained within the container 1, so that the energy transfer onto the processed material is enforced.

In order to avoid heat losses to the outside, the walls of the casing 42 and suitably also of the cover 28 of the receptacle 1 are heat-insulated. In the embodiment according to FIGS. 3 and 4, the tools 30 or 31, respectively, disposed in the upper section 2 and in the lower section 3 of the receptacle 1 can be driven independently from each other. For this, the tools 31 are fixed to a central shaft 32 and the tools 30 to a hollow shaft 43 coaxially surrounding this shaft 32. The two shafts 32, 43 are driven via toothed rings 44 or 45, respectively, by two gears 35, 46, both of which may be driven by a common motor 34. The two gears 35, 46 are controllable via control lines (not shown), suitably independently from the temperatures of the processed material measured via the temperature sensors 37, 38 (FIGS. 1, 2). The motor 34 and the gears 35, 46 can be carried by the cover 28.

The upper tools 30 are here formed by a disc 72, which carries the cutting elements 70 on its outer periphery. This disc can rotate in the same direction as the tools 31 positioned within the lower interior portion 69 of the receptacle 1 (arrow 41, FIG. 4). The two driving shafts 32, 43, however, result also in the possibility to choose different directions of rotation.

Figure 4:
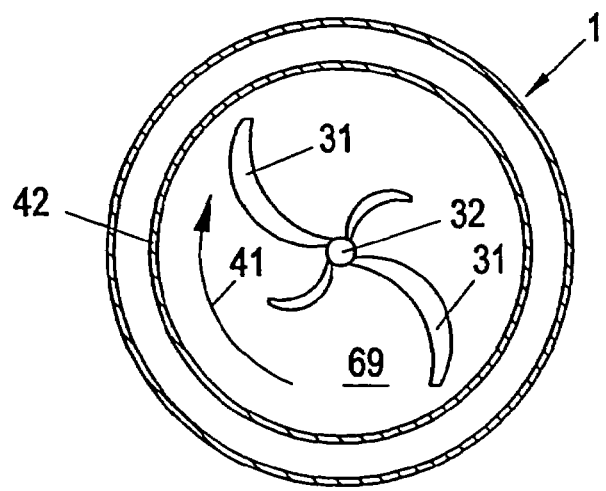
FIG. 4 shows a detail in a horizontal section.

FIG. 4 shows a particular suitable shape of the tools 31 for the lower portion 3 of the receptacle 1. As can be seen, the tools 31 are curved in the direction of their rotation (arrow 41) in order to convey the processed material from the outer edge towards the center, which results in a special mixing action.

An additional influence upon the temperature conditions in the two container sections 2, 3 can be obtained by tempering the material within the respective section 2 or 3, respectively, via hollow spaces 47 of the tools 30 or 31, respectively, to which supply lines 48 are connected, via which a tempering medium is fed into the hollow spaces 47. The tempering medium is fed into the supply lines 48 from tempering medium sources 49 via suitably rotating joints. The tempering medium must not be the same for all tools 30 and 31. For example, it is possible to additionally heat the disc 72 forming the tools 30 by the tempering medium, in order to raise the temperature of the material processed by the disc or, respectively, by the cutting edges 70 as quickly as possible to the desired level while the tools 31 are cooled by another tempering medium or by a tempering medium having another temperature. The temperatures of the tempering media supplied to the tools 30, 31 can be controlled in a suitable manner.

A further possibility for influencing the temperature of the material positioned within the receptacle 1 results from tempering the interior of the receptacle 1 by a double-walled construction of its casing 42. In FIG. 3 this is shown, whereby the hollow space 52 positioned between the two walls 50, 51 of the casing 42 is sub-divided by partition walls 53 into two superimposed sections 54, 55, respectively connected to a line 56 or 81 for the supply or, respectively, discharge of a tempering medium which may be a gas or a liquid. The two lines 56 are connected via control means 57 or 58, respectively, to a source 59 for the tempering medium. If desired, the two control means 57, 58 can be supplied by different sources for the tempering medium. The control means 57, 58 can control the amount and/or temperature of the respective tempering medium, or they can be influenced by the temperature sensors 37, 38 (FIGS. 1, 2). As can be seen, the temperature conditions within the two sections 2, 3 of the receptacle 1 can be influenced by choosing the position of the partition wall 53. Therefore, the partition walls 53 can but need not be positioned at the location at which the funnel-shaped section 3 changes into the upper cylindrical section 2.

Between the edge of the disc 72 and the inner wall 51 of the receptacle 1 there is an annular gap 73, the width thereof, as a rule, amounting to at least 20 mm, so that the material circulated within the interior portion 68 and heated thereby can gradually reach the lower interior portion 69 of the receptacle 1. In order to avoid that the processed material penetrates this annular gap 73 too quickly, its width, however, should not be too large; as a rule, it is smaller than 30 mm. An adaptation to different conditions of the processed material is possible, if the width of this annular gap 73 can be changed. For this, the disc 72, or, respectively, the inner wall of the receptacle, can be so constructed that the respective edge sections of the disc 72 or, respectively, the wall are adjustable in a radial direction.

The receptacle 1 has an effective capacity in kilograms for the processed material of at least half, and if desired one to three times the hourly throughput of the screw 7 in kilograms. The drive means (motor 34) for the upper tools 30 suitably introduces a mixing energy of 3 to 12 kWh per 100 kg/h throughput of the screw into the processed material. These operating examples have provided results. The actual operating conditions, however, will depend on the specific composition and the condition of the material introduced into the receptacle 1.

The shaft 32 (and, respectively, also the hollow shaft 43) need not be positioned exactly vertical, and inclinations are possible. However, there results all the more a conveyance of the material positioned within the receptacle 1 to above or, respectively, to below, the more the shaft is inclined. In the lower interior portion 69, such a conveyance in a vertical direction, as a rule, is not desired, because in the lower portion the material should only be agitated and should not be more substantially heated.

Figure 5:
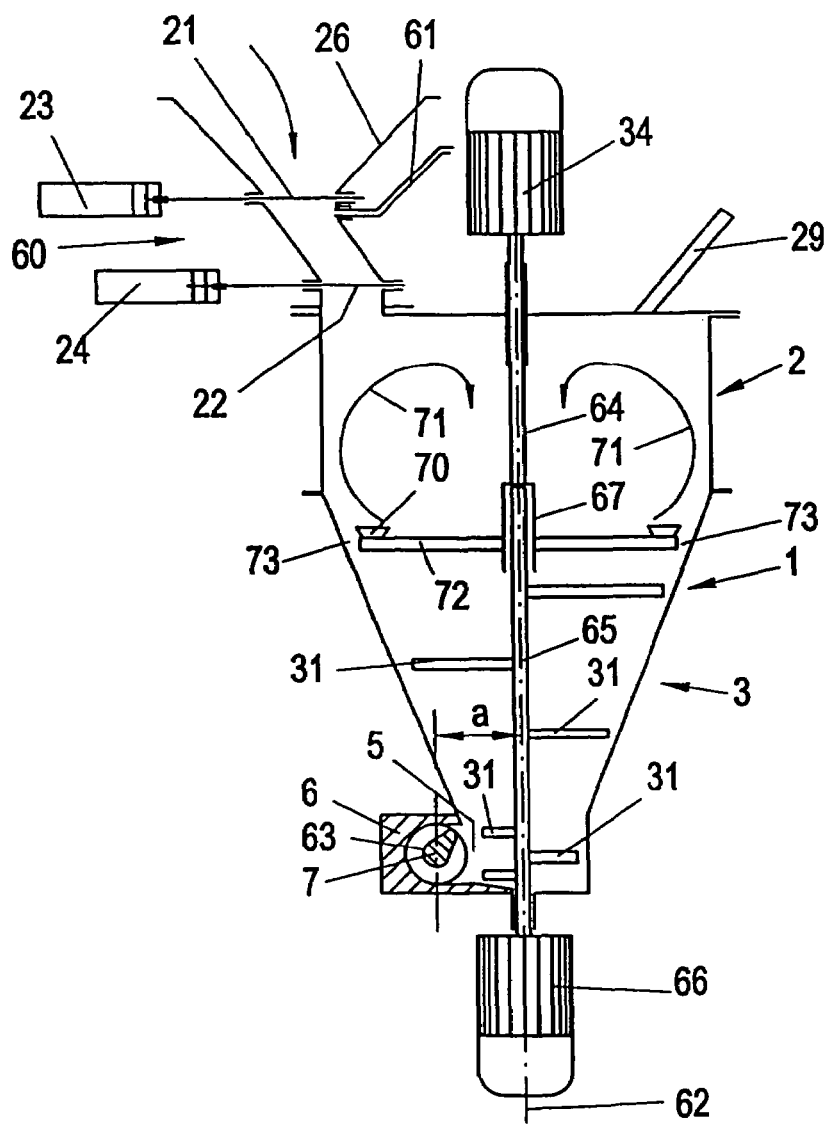
FIG. 5 shows a third embodiment in a vertical section.

In the embodiments according to FIGS. 1 to 4, the filling of the housing 6 of the screw 7 takes place in a radial direction with respect to the axis 63 of the screw 7, with which radial direction the axis 62 of the receptacle 1 coincides. Just so, the housing 6 of the screw 7 can be filled on its front side with the material from the receptacle 1. As FIG. 5 shows, however, a tangential connection of the screw housing 6 of the receptacle 1 is also possible so that the axis 62 of the container is spaced apart from the screw axis 63 for a distance a. This enables one to subdivide the shaft carrying the tools 30, 31 and to drive each of the two shaft sections 64, 65 by controllable motor 34 or 66, respectively, from above and respectively from below.

For this, it is suitable to give the lower end of the upper shaft section 64 the form of a sleeve 67 surrounding the lower shaft section 65, so that the two shaft sections 64, 65 are centered relative to each other and bearingly supported. This tangential connection of the screw housing 6 to the receptacle 1 enables one also to obtain a stuffing filling of the screw housing 6 by tools 31 rotating around the vertical axis 62 and disposed in the area of the lateral outflow opening of the receptacle 1 or, respectively, of the filling opening 5 of the screw housing 6.

In this embodiment, the tools 30 are also constituted by cutting edges 70 carried by a disc 72. This disc 72 is disposed somewhat lower than the upper edge of the funnel-shaped lower container section 3. This favors forming the mixing cone 71, because the material treated by the cutting edges 70 is thrown off the disc 72 in a radial direction and reaches the inclined portions of the wall of the casing of the container section 3, so that the impinging material receives a component of motion to above.

Figure 6:
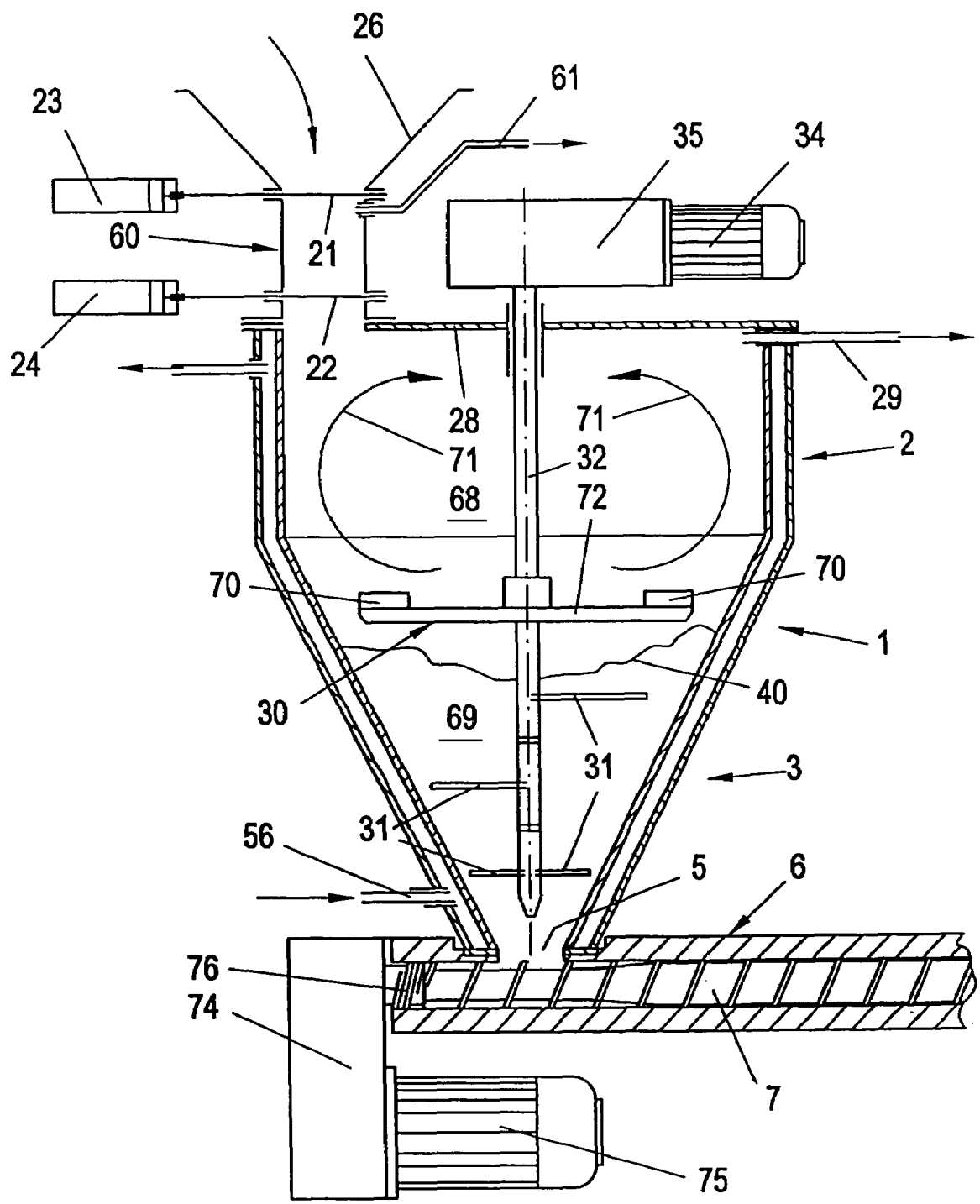
FIG. 6 shows a fourth embodiment in a vertical section.

In the embodiment according to FIG. 6 the disc 72 carrying the cutting edges 70 is disposed at about the middle of the height of the receptacle 1 and substantially below the line where the two container sections 2, 3 change into each other. As mentioned, the tools 31 disposed below the disc 30 agitate the processed material only, however they do not impart it to become a mixing cone, so that there results an almost flat material level 40 within the interior portion 69.

The lower end of the funnel-shaped container portion 3 merges into the filling opening 5 of an extruder screw 7, driven via a gear 74 by a motor 75. Sealing screw threads 76 prevent the processed material from exiting at the drive side end of the screw 7.

As FIGS. 7 and 8 show, the receptacle 1 may below merge into the filling opening 79 of a dosing screw device 77, which, for example, comprises two dosing screws 78, driven by a common motor 75 and having parallel axes. This dosing screw device conveys the material into a radially disposed filling opening 5 of an extruder screw 7.

A variant to this is shown in FIGS. 9 and 10. Here, the double dosing screw 78 conveys the material received from the receptacle 1 into a shaft 80 from which it falls into the extruder screw 7 from above.

From the described embodiments an average dwell time of at least half an hour can be obtained for each pre-comminuted plastic particle introduced into the container 1. This dwell time is calculated from the entry of the plastic particle into the upper sluice 60 until it exits from the container 1 through the outflow opening 4.

The lower outflow opening 4 of the container 1 can also feed the material to another plant, as is shown, for example, by means of a conveyor means to a silo or to a device for any further processing, also to a dosing apparatus.

The invention claimed is:

1. Apparatus for processing a pre-comminuted plastic material comprising a screw rotatably supported in a housing having a filling opening, an upright receptacle for receiving material having a height and a lower outflow opening proximate a lower end of the receptacle in fluid communication with the filling opening for feeding the material to the screw, the receptacle defining an upper space and a lower space in fluid communication with the outflow opening which forms a dwell space for the material while material is being processed, first and second tools rotatably arranged in the receptacle for acting on the material, the second tool being arranged below the first tool, and a drive for rotating the first tool at a sufficient rotational speed so that the first tool introduces heat energy into the material in an upper space of the receptacle above the first tool and for rotating the second tool at a rate selected to introduce less heat energy into the material in a lower space of the receptacle below the first tool than the heat energy introduced into the material in the upper space so that the second tool thereby homogenizes the temperature of the material heated by the first tool and prevents an agglomeration of the material in the lower space.

2. Apparatus according to claim 1, wherein the first tool is positioned on an upper side of a disc having an edge spaced a sufficiently small distance from an inner wall of the receptacle to limit a flow of the material from the upper space to the lower space and thereby cause a circulation of the material in the upper space and form a mixing cone of circulating material in the upper space.

3. Apparatus according to claim 2, wherein the distance amounts to at least 20 mm.

4. Apparatus according to claim 2, wherein the distance is adjustable.

5. Apparatus according to claim 1, wherein the receptacle has an upper cylindrical portion defining the upper space and a lower conical portion that tapers toward the filling opening and defines the lower space.

6. Apparatus according to claim 5, wherein the first tool creates a mixing cone formed by the material in a region of an upper end of the conical section.

7. Apparatus according to claim 5, wherein a height of the cylindrical section of the receptacle is in the ratio of 3:1 to 1:3 to a height of the conical section of the receptacle.

8. Apparatus according to claim 1, wherein the second tool in the lower space extends for a lesser distance in a radial direction than the first tools in the upper space.

9. Apparatus according to claim 1, wherein the second tool in the lower space is formed as a curved mixing wing.

10. Apparatus according to claim 1, including a cover for vacuum-tight sealing a top of the receptacle which has an intake opening for introducing the material, a chamber connected to the intake opening, slide gates for closing and vacuum-tight sealing the chamber from below and above, and an evacuating line connected to the receptacle for applying a vacuum to the receptacle.

11. Apparatus according to claim 10, including a controllable drive for the tools carried by the cover.

12. Apparatus according to claim 11, including gearing between the drive and the tools.

13. Apparatus according to claim 1, including coaxial shafts for independently driving the first and second tools.

14. Apparatus according to claim 13, wherein the second tool rotates at a lesser velocity than the first tool.

15. Apparatus according to claim 13, wherein the shaft for driving the first tool is carried by a hollow outer shaft and the shaft for driving the second tool is an inner shaft surrounded by the outer shaft, and including a drive disposed at upper ends of the shafts for rotating the shafts.

16. Apparatus according to claim 13, including a first drive for driving the upper shaft disposed at an upper end thereof, and a second drive for driving the lower shaft disposed at a lower end thereof.

17. Apparatus according to claim 1, wherein the outflow opening is connected tangentially to a housing of the screw.

18. Apparatus according to claim 1, including at least one temperature sensor disposed in each of the upper space and the lower space.

19. Apparatus according to claim 1, wherein the receptacle has a heat-insulating casing.

20. Apparatus according to claim 1, wherein the receptacle has at least one double-walled section forming a hollow space therebetween and connected to a line for a tempering medium.

21. Apparatus according to claim 1, wherein at least one of the first and second tools has a hollow space for the introduction of a tempering medium.

22. Apparatus according to claim 1, wherein at least one first tool creates a mixing cone in the upper space and is formed as a comminuting tool provided with cutting edges.

23. Apparatus according to claim 1, wherein the screw transports a given amount of plastic material per hour, and wherein a volume of the receptacle is sized to hold at least half the amount of plastic material transported by the screw per hour.

24. Apparatus according to claim 23, wherein the volume of the receptacle holds between one to three times the amount of plastic material transported by the screw per hour.

25. Apparatus according to claim 1, wherein the first tool introduces heat into the material in the upper space of 3 to 12 kWh per 100 kg/h throughput of the screw.

26. Apparatus for processing a pre-comminuted plastic material to be directed to a screw rotatably supported in a housing having a filling opening for the material comprising an upright receptacle for receiving material having a height and a lower outflow opening proximate a lower end of the receptacle in fluid communication with the filling opening, first and second tools rotatably arranged in the receptacle for acting on the material, the first tool being arranged in a mid-region of the height of the receptacle, and the second tool being arranged below the first tool, and a drive for rotating the first and second tools at a given rate of rotation, the first tool being configured so that at the given rate of rotation the first tool introduces heat energy into the material in a space of the receptacle above the first tool, the second tool being configured so that at the given rate of rotation the second tool mixes and introduces less heat energy into the material in a space below the first tool than the heat energy introduced by the first tool into the material in the space above the first tool to thereby homogenize the temperature of the material heated by the first tool and prevent an agglomeration of the material in the space below the first tool.

* * * * *